United States Patent Office 3,177,228
Patented Apr. 6, 1965

3,177,228
PROCESS FOR THE PRODUCTION OF CYCLIC ETHERS OF AROMATIC COMPOUNDS CONTAINING HYDROXYL GROUPS
Walter Böhm, Leverkusen-Schlebusch, Hans Haberland, Leverkusen, and Rudolf Stroh, Leverkusen-Bayerwerk, Germany, assignors to Farbenfabriken Bayer Aktiengesellschaft, Leverkusen, Germany, a corporation of Germany
No Drawing. Filed Nov. 28, 1960, Ser. No. 71,874
Claims priority, application Germany, Dec. 3, 1959, F 29,996
5 Claims. (Cl. 260—345.2)

The present invention relates to a particular process for the production of cyclic ethers of aromatic compounds containing hydroxyl groups and more especially to the production of chromanes and coumaranes.

It is already known to react phenols and naphthols, which may be substituted, with monoolefines in the presence of metal phenolates (German Patent 944,014 and U.S. Patent 2,831,898). Phenols alkylated in the o- and/or p-positions are obtained with a good yield by these processes. It is possible in this way to prepare without difficulty the o- and o,o-dialkylated phenols which formerly were difficult to obtain.

On the other hand, reactions of compounds containing hydroxyl groups with conjugated diolefines in the presence of metal phenolates are not so far known.

According to the state of the art it would be expected that reaction of phenols with diolefines containing a conjugated double bond in the presence of metal phenolates would lead to the formation of o-, o,o-, or p-alkylated phenols insofar as the greater reactivity of the diolefines does not lead to polymerisation reactions and thus reaction products of indefinite composition.

It is an object of the present invention to provide a particular process for the production of cyclic ethers of aromatic compounds containing hydroxyl groups. Another object is to provide a process which starts from simple starting materials and can be carried out in a simple manner. According to yet another object, the process is to be particularly suitable for the production of chromanes and coumaranes.

Finally, it is an object of the invention that the new process can be carried out easily on an industrial scale. Further objects of the invention will be apparent from the following description and examples.

It has now been found that cyclic ethers of aromatic compounds containing hydroxyl groups can be obtained in a simple manner and with good yields if phenols which may be substituted, which have at least one free o-position to a hydroxyl group are reacted with dienes which contain the two double bonds in conjugation, in the presence of a metal phenolate at elevated temperature and if desired, in the presence of a solvent.

The cyclic ethers of aromatic compounds containing hydroxyl groups, such as chromanes and coumaranes, which are obtained according to the process of the present invention have hitherto only been obtainable by processes which were more difficult than the process according to the present invention. Processes suitable for operation on an industrial scale did not exist.

The phenols which can be used according to the invention can be mononuclear or polynuclear and contain one or more hydroxyl groups. Thus, compounds which are suitable are hydroxybenzenes, hydroxynaphthalenes, hydroxyanthracenes and hydroxyphenanthrenes. All phenols which are substituted in the nucleus and which have at least one free o-position relative to the hydroxyl group can be employed for the process according to the invention.

All groups which are inert under the reaction conditions of the invention, may be considered as substituents. These include mainly lower alkyl and alkoxy groups and also the halogens. The following phenols have proved to be especially suitable: phenol, o-chlorophenol, m-chlorophenol, p-chlorophenol 2,4-dichlorophenol, o-, m- and p-cresol, 3,5-dimethyl-4-chlorophenol, 2-methoxyphenol as well as α-naphthol and β-naphthol.

All dienes which contain the two double bonds in conjugation are in principle suitable as olefines for the reaction according to the invention. It is preferred to use lower aliphatic dienes, such as isoprene, 1,3-butadiene, 2,3-dimethyl-1,3-butadiene and piperylene. For stabilising the olefines, it may be advisable to add stabilizers such as phenthiazine, hydroquinone or alkylated amines there to.

As metal phenolates of use for the reaction according to the invention may be considered all the phenolates which contain as metal component one of the following metals: zinc, aluminum, magnesium, calcium, sodium and lithium.

The metal phenolates can either be added as such to the reaction mixture or can be produced from the components in the reaction mixture.

For the separate production of the metal phenolates, the appropriate phenol may be heated in a pressure vessel with 0.5 to 10% preferably with 5 to 8% of its weight of the metal with which it is to be reacted until the evolution of hydrogen has ceased. In this way, the metal phenolate is obtained, which may be dissolved in a small excess of phenol depending on the molecular weight of the phenol employed. This mixture is then employed as catalyst for the actual reaction according to the invention.

The metals are added as fine or coarse powder or shavings for the production of the phenolate. It is sometimes also advisable to employ alloys of the metals concerned. Particularly good results are also obtained in many cases with metals amalgamated by small quantities of mercury. The amalgamation can be achieved by adding mercury salts, such as mercuric chloride.

The phenol component of the catalytically active metal phenolate may be identical with the phenol to be converted to the cyclic ether, but metal phenolates with other phenol components may also be used. In this case, apart from the cyclic ether of the phenol to be converted, the cyclic ether of the phenol which was introduced in the form of the metal phenolate as catalyst is also in a minor proportion.

Aromatic hydrocarbons, such as benzene, toluene and xylene, are suitable as solvents for the process according to the invention.

The reaction according to the invention is preferably carried out in such a way that first of all the phenol is heated with 0.5 to 10% and preferably 1 to 2% of its weight of metal in a pressure vessel until the metal phenolate has formed, which stage can be recognized by cessation of the evolution of hydrogen. After releasing the excess hydrogen, 1 to 1.5 mols of the diolefine, related to the phenol used, are immediately pumped in at temperatures in the region from 50 to 180° C., advantageously between 100 and 140° C. Absorption of the olefine is indicated by the fall in pressure. The reaction is generally completed after 4 to 6 hours. When carrying out a reaction in which the phenol component of the metal phenolate is not identical with the phenol to be reacted, it is advisable to prepare the metal phenolate with the smallest possible phenol excess in the reaction vessel, then to add the phenol to be reacted and only then to start the reaction by adding the diolefine.

Both reactions, that is to say, both the formation of the metal phenolate and the formation of cyclic ether, can be carried out in an open vessel. The olefine to be reacted is either introduced in gaseous form or slowly added dropwise.

The reaction product can be worked up by conventional methods and preferably is so conducted that first of all the metal phenolate is hydrolytically decomposed with water, the reaction product is filtered and then subjected to a fractional vacuum distillation.

The process can also be carried out continuously by causing the diolefine to act on the phenol in the presence of metal phenolates in a suitable apparatus. For this process, it is advisable to prepare metal phenolates in advance and to react them jointly with the two reactants in the reaction vessel.

The cyclic ethers obtained according to the invention are suitable as intermediate products for the manufacture of dyestuffs, plastics, rubber auxiliaries and insecticides.

The present invention is further disclosed in the following examples, which are illustrative but not limitative thereof.

Example 1

94.1 parts by weight (1 mol) of phenol, 1.5 parts by weight of coarse aluminium powder and 200 parts by volume of toluene are heated for 2 hours in a pressure vessel to 180° C. 210 parts by volume (2.1 mols) of isoprene with 0.5 part by weight of phenthiazine are pumped in over 4 hours at 120° C. and this temperature is held for another 4 hours. The reaction products are separated by vacuum distillation at 10 mm. Hg. The following products are obtained: 70.8 parts by weight of 2,2-dimethylchromate, B.P. 93°/10 mm.; 5.3 parts by weight of p-3-methylcrotylphenol, B.P. 139°/10 mm.; 20.8 parts by weight of 5-(3-methylcrotyl)-2,3,3-trimethyl coumarane admixed with 5-(3-methylcrotyl)-2,3,3-trimethyl coumarane, B.P. 155°/10 mm. and 32 parts by weight of 6-(3-methylcrotyl)-2,2-dimethylchromane, B.P. 165°/10 mm.

Example 2

128.6 parts by weight (1 mol) of p-chlorophenol, 1.5 parts by weight of aluminum shavings and 200 parts by volume of toluene are heated for 2 hours in a pressure vessel to 180° C. Thereafter, 110 parts by volume (1.1 mol) of isoprene with 0.3 part by weight of phenthiazine are pumped in within 1 hour at 150° C. and the temperature is held for 2 hours at 150° C. There are obtained 132 parts by weight of 6-chloro-2-dimethyl chromane, B.P. 129°/10 mm., M.P. 28–29° C.

Example 3

128.6 parts by weight (1 mol) of p-chlorophenol, 1.9 parts by weight of coarse aluminium powder and 200 parts by volume of toluene are heated for 1 hour in a pressure vessel to 180° C. A mixture of 26 parts by volume of toluene, 2 parts by weight of dimethyl formamide, 0.6 part by weight of phenthiazine and then 104 parts by volume (1.2 mols) of butadiene are pumped in at 120° C. and this temperature is held for another 4 hours. The following products are isolated from the reaction mixture: 55.3 parts by weight of 5-chloro-2,3-dimethyl-coumarane (trans-form), B.P. 109°/10 mm., and 70 parts by weight of 5-chloro-2,3-dimethyl coumarane (cis-form), B.P. 117°/10 mm.

Example 4

163 parts by weight (1 mol) of 2,4-dichlorophenol and 1.9 parts by weight of aluminium chips are heated for 1 hour in a pressure vessel to 180° C. 120 parts by volume (1.2 mols) of isoprene with 0.3 part by weight of phenthiazine are then pumped in within 4 hours at 120° C. and the reaction is completed in another 4 hours. 160 parts by weight of 6,8-dichloro-2,2-dimethyl-chromane, B.P. 152°/10 mm., are obtained.

Example 5

162.1 parts by weight (1.5 mols) of p-cresol are heated with 30 parts by weight of freshly prepared aluminium phenolate and 200 parts by volume of toluene in a pressure vessel to 120° C. 180 parts by volume (1.8 mols) of isoprene are then pumped in over 1 hour and the temperature is held for another 2 hours at 120° C. The following reaction products are isolated: 55 parts by weight of an azeotropic mixture, B.P. 103°/10 mm., consisting of 2,2,3,5-tetramethyl and 2,3,3,5-tetramethyl coumarane, as well as 52.5 parts by weight of 2,2,6-trimethyl chromane, B.P. 111°/10 mm.

Example 6

156.6 parts by weight (1 mol) of 3,5-dimethyl-4-chlorophenol, 2.4 parts by weight of aluminum shavings and 200 parts by volume of toluene are initially heated for 1 hour in a pressure vessel to 180° C. and thereafter 120 parts by volume (1.2 mols) of isoprene with 0.3 part by weight of phenthiazine are pumped in over 3 hours at 120° C. After another hour the reaction is completed. Yield: 162 parts by weight of 6-chloro-2,2,5,7-tetramethylchromane, M.P. 60–61° C.

Example 7

128.6 parts by weight (1 mol) of p-chlorophenol and 1.9 parts by weight of aluminum shavings are heated in 200 parts by volume of toluene in a pressure vessel for 2 hours to 180° C. 124.5 parts by volume (1.1 mols) of 2,3-dimethyl-1,3-butadiene with 0.35 part by weight of phenthiazine are then pumped in at 120° C. over 4 hours and the reaction is completed within another 4 hours at 120° C. 153 parts by weight of 6-chloro-2,2,3-trimethyl chromane, B.P.: 135°/10 mm., are obtained as reaction product.

Example 8

128.6 parts by weight (1 mol) of p-chlorophenol and 1.5 parts by weight of coarse aluminum powder are heated for 1 hour to 180° C. in a three-necked flask provided with a reflux condenser and stirrer device. After adding 200 parts by volume of toluene, 110 parts by volume (1.1 mols) of isoprene are added dropwise over 4 hours at 100° C. and the mixture is stirred for another 4 hours at the same temperature. There are obtained 126 parts by weight of 6-chloro-2,2-dimethylchromane, B.P.: 129°/10 mm., M.P. 28–29° C., as well as 5.2 parts by weight of a dialkylated p-chlorophenol, B.P.: 178°/10 mm.

Example 9

144.1 parts by weight (1 mol) of β-naphthol and 2.2 parts by weight of coarse aluminum powder are heated in 200 parts by volume of toluene in a pressure vessel for 1–2 hours to 180° C. 110 parts by volume (1.1 mols) of isoprene (with 0.3 part by weight of phenthiazine) are then pumped in at 120° C. within 3 hours and the mixture is stirred for another 2 hours at 120° C. There are obtained 71 parts by weight of 2,2-dimethyl-5,6-benzochromane, B.P. 177/10 mm., M.P. 77° C.

We claim:

1. Process for the preparation of cyclic ethers of the chromane and coumarane type, which comprises reacting a phenol having a free position ortho to a hydroxyl group selected from the group consisting of phenol, methyl substituted phenol, chloro substituted phenol, methyl and chloro substituted phenol, cresol, methoxy substituted phenol and naphthol with a lower aliphatic conjugated diene having 4 to 6 carbon atoms in the presence of a phenolate of a metal selected from the group consisting of zinc, aluminum, magnesium, calcium, sodium and lithium, the phenol component of said phenolate being as above defined at a temperature of between 50 and 180° C. and recovering the cyclic ether reaction product thereby formed.

2. Process according to claim 1, which comprises effecting said reaction in the presence of a solvent selected from the group consisting of benzene, toluene and xylene.

3. Process for the preparation of 2,2-dimethylchromane, which comprises reacting phenol with isoprene at a temperature of about 120° C. in the presence of aluminum powder, and recovering the 2,2-dimethyl chromane from the reaction product thereby formed.

4. Process for the preparation of 5-chloro-2,3-dimethyl coumarane, which comprises reacting p-chlorophenol with butadiene in the presence of aluminum powder at a temperature of about 120° C., and recovering the 5-chloro-2,3-dimethyl coumarane from the reaction product thereby formed.

5. Process for the preparation of 2,2-dimethyl-5,6-benzo chromane, which comprises reacting β-naphthol with isoprene in the presence of aluminum powder at a temperature of about 120° C., and recovering the 2,3-dimethyl-5,6-benzo chromane from the reaction product thereby formed.

References Cited in the file of this patent

UNITED STATES PATENTS

| | | |
|---|---|---|
| 2,320,746 | Paul | June 1, 1943 |
| 2,358,286 | Hromotka | Sept. 12, 1944 |
| 2,831,898 | Ecke et al. | Apr. 22, 1958 |

FOREIGN PATENTS

| | | |
|---|---|---|
| 529,082 | Great Britain | Nov. 13, 1940 |

OTHER REFERENCES

Clemo et al.: J. Chem. Soc. (London), pp. 4347–9 (1955).